United States Patent
Azulai et al.

(10) Patent No.: US 11,741,732 B2
(45) Date of Patent: Aug. 29, 2023

(54) TECHNIQUES FOR DETECTING TEXT

(71) Applicant: International Business Machines Corporation, Armonk, NY (US)

(72) Inventors: Ophir Azulai, Tivon (IL); Udi Barzelay, Haifa (IL); Oshri Pesah Naparstek, Karmiel (IL)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 17/558,937

(22) Filed: Dec. 22, 2021

(65) Prior Publication Data

US 2023/0196807 A1    Jun. 22, 2023

(51) Int. Cl.
 *G06V 30/414* (2022.01)
 *G06V 30/148* (2022.01)
 *G06V 30/19* (2022.01)

(52) U.S. Cl.
 CPC ...... *G06V 30/153* (2022.01); *G06V 30/19147* (2022.01); *G06V 30/414* (2022.01)

(58) Field of Classification Search
 CPC .............................................. G06V 30/00–43
 See application file for complete search history.

(56) References Cited

U.S. PATENT DOCUMENTS

| | | | | |
|---|---|---|---|---|
| 5,438,630 A | * | 8/1995 | Chen | G06F 18/295 382/196 |
| 5,745,600 A | * | 4/1998 | Chen | G06V 30/262 382/218 |
| 5,825,919 A | * | 10/1998 | Bloomberg | G06V 30/414 382/177 |
| 5,867,597 A | * | 2/1999 | Peairs | G06V 30/414 382/229 |

(Continued)

FOREIGN PATENT DOCUMENTS

| | | |
|---|---|---|
| EP | 0655703 A2 | 5/1995 |
| WO | 2021051604 A1 | 3/2021 |

OTHER PUBLICATIONS

"Notification of Transmittal of the International Search Report and the Written Opinion of the International Searching Authority" dated Feb. 21, 2023, International Application No. PCT/EP2022/085464, 9 pages.

(Continued)

*Primary Examiner* — Sean T Motsinger
(74) *Attorney, Agent, or Firm* — Barry D. Blount (57) ABSTRACT

In some examples, a system for detecting text in an image includes a memory device to store a text detection model trained using images of up-scaled text, and a processor configured to perform text detection on an image to generate original bounding boxes that identify potential text in the image. The processor is also configured to generate a secondary image that includes up-scaled portions of the (Continued)

image associated with bounding boxes below a threshold size, and perform text detection on the secondary image to generate secondary bounding boxes that identify potential text in the secondary image. The processor is also configured to compare the original bounding boxes with the secondary bounding boxes to identify original bounding boxes that are false positives, and generate an image file that includes the original bounding boxes, wherein those original bounding boxes that are identified as false positives are removed.

20 Claims, 4 Drawing Sheets

(56) References Cited

U.S. PATENT DOCUMENTS

| | | | | |
|---|---|---|---|---|
| 6,597,808 | B1* | 7/2003 | Guo | G06V 30/1444 |
| | | | | 382/173 |
| 9,569,679 | B1* | 2/2017 | Gray | H04N 1/40062 |
| 11,430,166 | B1* | 8/2022 | Jain | G06T 11/60 |
| 2012/0134581 | A1* | 5/2012 | Matsuda | H04N 1/41 |
| | | | | 382/164 |
| 2012/0250105 | A1* | 10/2012 | Lukac | G06V 30/162 |
| | | | | 358/464 |
| 2018/0129899 | A1* | 5/2018 | Harron | G06V 10/26 |
| 2018/0349722 | A1* | 12/2018 | Chiang | G06V 30/1456 |
| 2019/0310868 | A1* | 10/2019 | Vaindiner | G06T 5/20 |
| 2020/0104586 | A1* | 4/2020 | Takahashi | G06V 30/32 |
| 2020/0210742 | A1 | 7/2020 | Kim et al. | |
| 2022/0058416 | A1* | 2/2022 | Vengalil | G06V 20/582 |
| 2022/0171967 | A1* | 6/2022 | Reisswig | G06V 30/414 |
| 2022/0284724 | A1* | 9/2022 | Schwiebert | G06V 30/416 |
| 2023/0094787 | A1* | 3/2023 | Bal | G06N 20/00 |
| | | | | 382/100 |

OTHER PUBLICATIONS

He et al., "Realtime multi-scale scene text detection with scale-based region proposal network", Pattern Recognition, Elsevier, GB, vol. 98, Sep. 3, 2019, 14 pages.

Disclosed Anonymously, "Automatically reading labels from components and integrated circuits", An IP.com Prior Art Database Technical Disclosure, Feb. 24, 2021, 8 pages.

Sharma et al., "A Hybrid Approach to Detect Text and to Reduce the False Positive Results in a Scenery Image", Computer Science and Engineering Department, Thapar University, Jun. 2016, 69 pages.

Tian et al., "Detecting Text in Natural Image with Connectionist Text Proposal Network", Computer Vision and Pattern Recognition, Sep. 12, 2016, 16 pages.

* cited by examiner

TECHNIQUES FOR DETECTING TEXT

BACKGROUND

The present disclosure relates to techniques for detecting text in images. Optical character recognition is an electronic process for converting images of typed or handwritten text into machine-encoded text. Optical character recognition has many applications, including the data entry, information extraction, making scanned images of documents searchable, and many others.

SUMMARY

According to an embodiment described herein, a system for detecting text in an image can include a memory device to store a text detection model trained using images of up-scaled text, and a processor to perform text detection on an image using the text detection model to generate original bounding boxes that identify potential text in the image. The processor is also configured to generate a secondary image that includes up-scaled portions of the image associated with bounding boxes below a threshold size, and perform text detection on the secondary image using the text detection model to generate secondary bounding boxes that identify potential text in the secondary image. The processor is also configured to compare the original bounding boxes with the secondary bounding boxes to identify original bounding boxes that are false positives, and generate an image file comprising the original bounding boxes, wherein those original bounding boxes that are identified as false positives are removed.

In some embodiments, a method of detecting text in an image can include performing text detection on an image to generate original bounding boxes that identify potential text in the image. The method also includes generating a secondary image that includes up-scaled portions of the image associated with bounding boxes below a threshold size, and performing text detection on the secondary image to generate secondary bounding boxes that identify potential text in the secondary image. The method also includes comparing the original bounding boxes with the secondary bounding boxes to identify original bounding boxes that are false positives, and generating an image file comprising the original bounding boxes, wherein those original bounding boxes that are identified as false positives are removed. The method may also include processing the image file with a text recognition algorithm to generate a text document comprising machine encoded text.

In yet another embodiment, a computer program product for detecting text in images can include a computer readable storage medium having program instructions embodied therewith, wherein the computer readable storage medium is not a transitory signal per se. The program instructions are executable by a processor to cause the processor to perform text detection on an image to generate original bounding boxes that identify potential text in the image. The program instructions also cause the processor generate a secondary image comprising up-scaled portions of the image associated with bounding boxes below a threshold size, and perform text detection on the secondary image to generate secondary bounding boxes that identify potential text in the secondary image. The program instructions also to cause the processor compare the original bounding boxes with the secondary bounding boxes to identify original bounding boxes that are false positives, generate an image file comprising the original bounding boxes, wherein those original bounding boxes that are identified as false positives are removed.

DETAILED DESCRIPTION

The present disclosure describes techniques for automatically identifying text images in a document. In many optical character recognition algorithms, the first step to converting text images to encoded characters involves detecting the presence of text. Various techniques exist for detecting text, such as regression-based text detection, segmentation-based text detection, and others. However, such methods may have difficulty detecting small font text. For example, text with a size of less than 9 pixels may tend to be missed.

Embodiments of the present techniques provide a text detection technique for identifying small text. According to embodiments, a text detection model is trained on up-sampled small text. The target document is then processed using the trained text detection model, which results in a list of bounding boxes surrounding the detected text. After the first pass, small bounding boxes may contain text or may be the result of a false positive detection. To eliminate false positives, the images corresponding with bounding boxes below a threshold size are up-scaled and copied to a new image. The new image is processed using the trained text detection model to confirm whether each of the bounding boxes in the new image actually contain text or whether some bounding boxes represent false positives.

Figure 1:
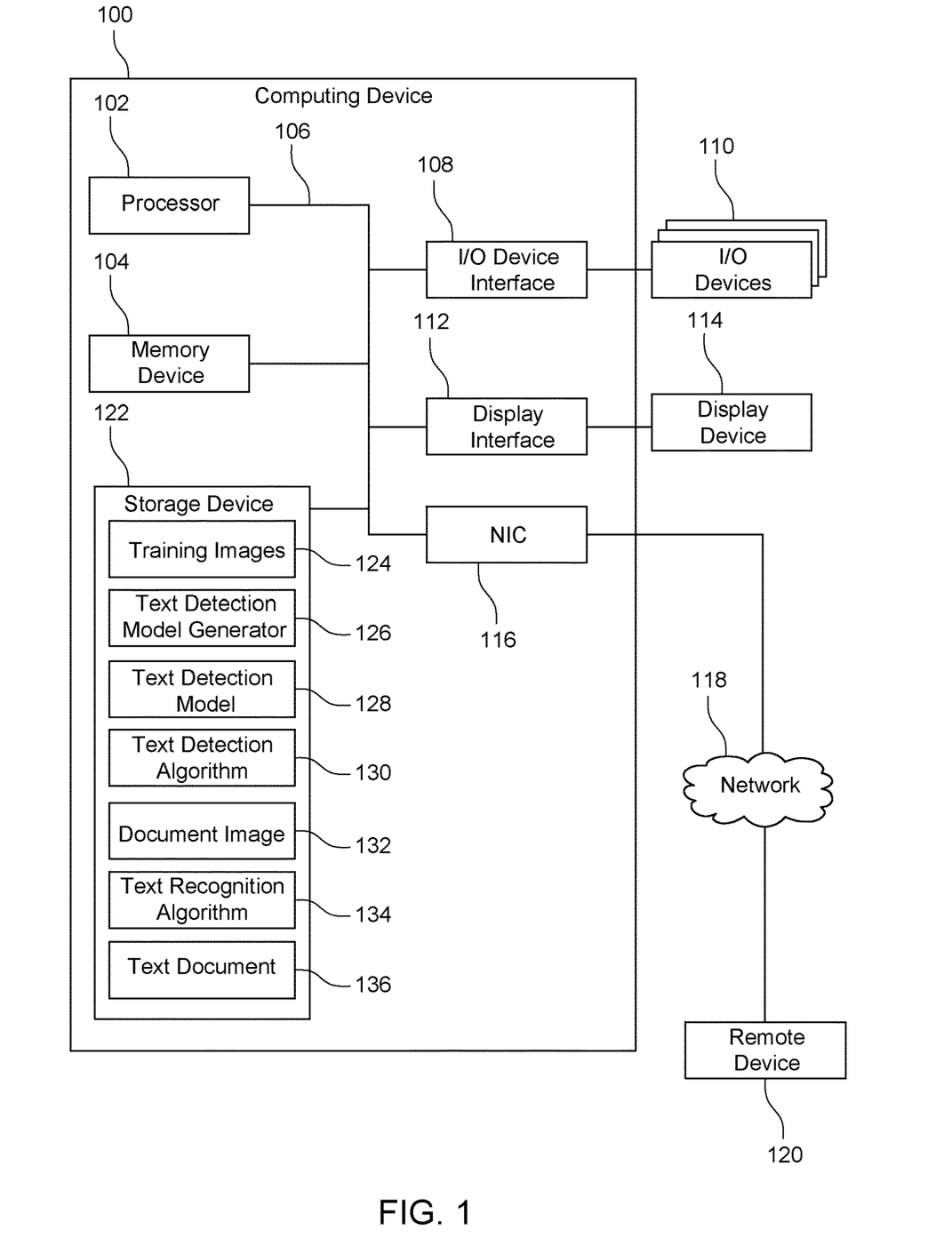
FIG. 1 depicts an example computing device that is configured to recognize text in images according to an embodiment described herein.

With reference now to FIG. 1, an example computing device is depicted that is configured to recognize text in images. The computing device 100 may be for example, a server, desktop computer, laptop computer, tablet computer, or smartphone. In some examples, computing device 100 may be a cloud computing node. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 that is adapted to execute stored instructions, a memory device 104 to provide temporary memory space for operations of said instructions during operation. The processor can be a single-core processor, multi-core processor, computing cluster, or any number of other configurations. The memory 104 can include random access memory (RAM), read only memory, flash memory, or any other suitable memory systems.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (NIC) 116 may be adapted to connect the computing device 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. A remote device 120 may connect to the computing device 100 through the network 118.

In some examples, the processor 102 can be linked through the system interconnect 106 to a storage device 122 that stores files, data, and programming code for implementation of the disclosed techniques. The storage device can include training images 124, a text detection model generator 126, a text detection model 128, a text detection algorithm 130, images 132, a text recognition algorithm 134, and text documents 136.

The training images 124 are the stored set of character images used to generate the text detection model 128. The character images may cover wide range of sizes to cover the range of text sizes that may be expected in a typical image. In some embodiments, the height of the character images may be a small as 9 pixels to 25 pixels, for example. Additionally, some character images may be up-scaled small text. For example, character images may be up-scaled from their original size by a factor of two, three, four or more. As such, an original character image on the order if 10-by-10 pixels may be increased in size to 20-by-20 pixels, 30-by-30 pixels, 40-by-40 pixels or more. Up-scaling increases the size of the character but also introduces image noise. In this way, the resulting text detection model may be better able to detect small text that has similar levels of image noise.

The text detection model generator 126 is a machine learning algorithm that processes the training images 124 to generate the text detection model 128. The text detection model 128, trained using the training images 124, can then be used by the text detection algorithm 130 to process the images 132. The images may be any suitable type of digital image, such as scanned documents, images captured by a camera, or a screen capture, and others.

The text detection algorithm 1130 operates in two phases. During the first phase, the algorithm produces a probability map or matrix describing a probability for each pixel regarding whether the pixel is inside a text character. The matrix of probabilities may be used to identify character boxes and to identify connected components, i.e., characters that are close enough to one another to be considered as forming a single word. The final result of the first phase of the text detection algorithm is an array of bounding boxes surrounding portions of the image that have been identified as possible words or characters.

The second phase of the text detection algorithm 130 is to eliminate false positives. Because the text detection model 128 is trained on small text, it is possible that small image artifacts such as stray marks or small shapes on a scanned image may cause a false positive. During the second phase, the bounding boxes generated in the first phase are analyzed to identify bounding boxes below a threshold size. The threshold may be, for example, a bounding box with height size below 10 pixels. For those bounding boxes below the threshold, the corresponding text is up-sampled to a larger size and copied to a new image, which may be referred to herein as a secondary image. The degree of up-scaling may result, for example, in a magnification of 2 to 4 times or more. The up-scaling also adds additional pixel data into the up-scaled image. Any suitable upscaling process may be used, including nearest neighbor interpolation, bilinear algorithms, bicubic algorithms, and others.

The new secondary image containing the up-sampled images is re-processed using the same text detection model 128 used in phase one, which produces a second array of bounding boxes. The bounding boxes for the first phase may be compared to the bounding boxes for the second phase to identify false positives. Comparison of the bounding boxes may include determining a degree of similarity between the two bounding boxes pertaining to the same image portion and comparing the degree of similarity to a similarity threshold. The degree of similarity may be determined by, for example, comparing the sizes of corresponding bounding boxes or the degree of overlap between the bounding boxes. If the corresponding bounding boxes are the same size or within a specified threshold of the same size, then the presence of text is confirmed. If the bounding box generated during the second phase is significantly smaller than the bounding box for the first phase, then the algorithm identifies the bounding box for the first phase as a false positive.

The degree of similarity may also be determined by compute a Jaccard index for the secondary bounding box and its corresponding original bounding box, which indicates the degree of overlap between the bounding boxes. In such cases, the similarity threshold may be a Jaccard index of 0.8 to 0.9, for example. Additionally, if no bounding box is detected where there previously was a bounding box identified during the first phase, then the bounding box from the first phase is identified as a false positive.

In most cases, the new image generated for the false positive identification will be relatively small, for example, on the order of height of 50 pixels and width of 400 pixels. Accordingly, the additional processing overhead used for the second phase will be expected to be small. In most cases, the second phase may increase the overall text detection processing time by 5 percent.

Once false positives have been identified, the bounding boxes identified in the first phase that have been identified as false positives can be eliminated. At this stage, the text detection process is complete, resulting in an electronic image with corresponding bounding boxes identifying area of the image that have been identified as containing text. The resulting electronic image may then be processed by a text recognition algorithm 134 to convert the text images to a text document 136 that includes digitally encoded text. The text recognition algorithm 134 may be any suitable optical character recognition (OCR) technique.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, modules, additional network interfaces, etc.). Furthermore, any of the functionalities of the text detection model generator 126, the text detection algorithm 130, and the text recognition algorithm 134 are partially, or entirely, implemented in hardware and/or in the processor 102. For example, the functionality may be implemented with an application specific integrated circuit, logic implemented in an embedded controller, or in logic implemented in the processor 102, among others. The term logic, as referred to herein, can include any suitable hardware (e.g., a processor, among others), software (e.g., an application, among others), firmware, or any suitable combination of hardware, software, and firmware.

Figure 2A:
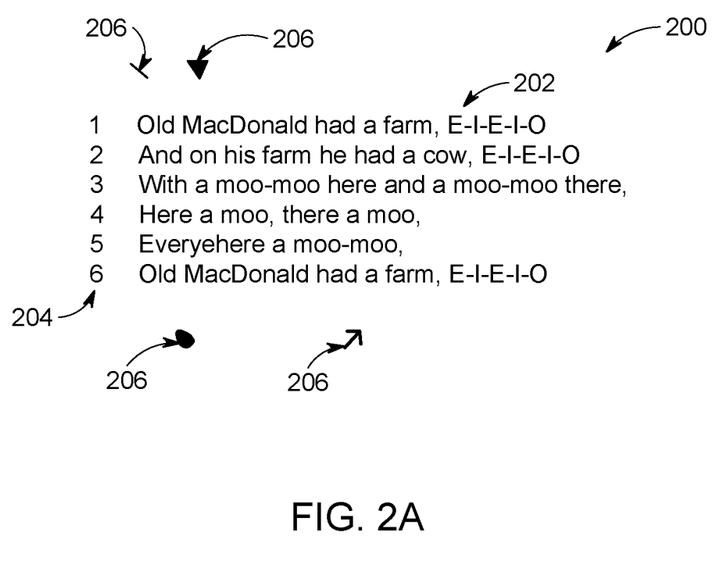
FIGS. 2A, 2B, 2C, and 2D are illustrations of a technique for detecting text in images according to an embodiment described herein.
Figure 2B:
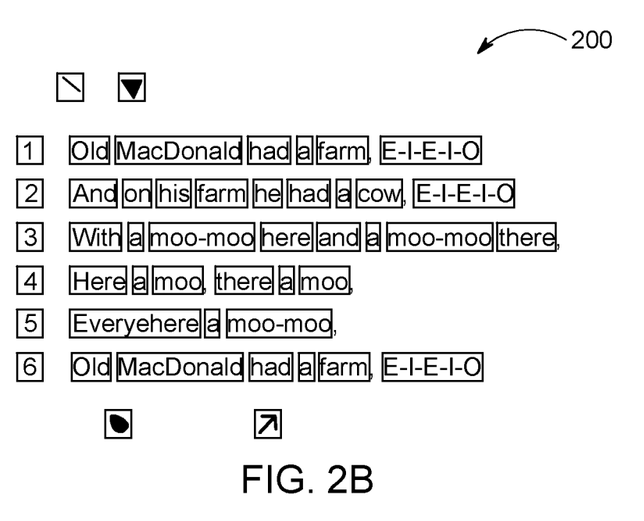
Figure 2C:
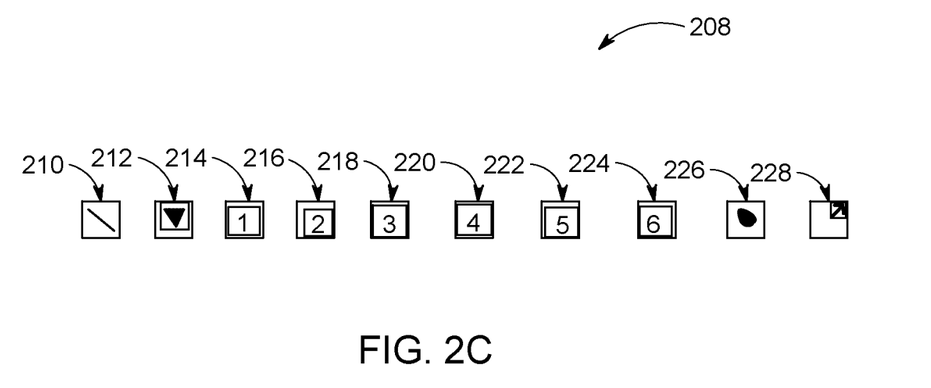

FIGS. 2A, 2B, and 2C are illustrations of a technique for detecting text in images. FIG. 2A shows an example of an image 200 containing text. The image 200 may be any suitable file type and may be any type of image, including a scanned document, an image captured by a camera, a screen capture, and others. The example image 200 can include text of various font styles and sizes, and may also include non-textual artifacts, such as stray marks, non-textual geometric shapes or images, and others. In the example, shown in FIG. 2A, the image includes large font text 202, small font text 204, and stray markings 206, which may be accidental marks introduced onto a paper document before it was scanned to produce the image 200.

FIG. 2B illustrates the image with bounding boxes after it has been through the first phase of the text detection process. At this stage, bounding boxes have been generated for each of the individual words and letters in both the large font text, and the small font text. Additionally, bounding boxes have also been generated for the stray marks.

FIG. 2C illustrates the small secondary image 208 generated during the second phase of the text detection process. The secondary image 208 includes portions 210-228 of the original image 200 associated with bounding boxes that are below the threshold size. Additionally, each of the identified portions imported into the small image 208 are enlarged, i.e., up-scaled, by the specified scaling factor to produce a larger image. The various portions may be included in the same small image. However, in some implementations, several small images, each with a certain number of image portions could be generated, or each image portion could be stored as a separate image. The location of each image portion within the small image 208 will be tracked so that it can be correlated with the appropriate bounding box within the original image 200. For example, the small image 208 may include or be associated with metadata that correlates each portion with its location in the original image.

As shown in FIG. 2C, the outer bounding boxes represent the original bounding boxes identified during the first phase of the text detection process, and may be referred to herein as the original bounding boxes. During the second phase of the text detection process, the small image 208 is processed using the same text detection algorithm and model used during the first phase, resulting in a new set of bounding boxes, also referred to herein as secondary bounding boxes. The new secondary bounding boxes identified during the second phase are shown in FIG. 2C as the inner bounding boxes.

As shown in FIG. 2C, some of the portions imported from the original image will not be identified as text by the text detection algorithm during the second phase, in which case, there is no secondary bounding box. For example, portions 210 and 226 do not show a secondary bounding box. In such cases, the bounding box for this image portion is identified as a false positive. In cases in which text is detected within the image portion, the original bounding box and the secondary bounding box may be compared to determine a degree of similarity. The degree of similarity can be compared with a similarity threshold, and if the degree of similarity is below the similarity threshold, the corresponding original bounding box is identified as a false positive.

The comparison may involve comparison of the relative sizes of the bounding boxes or degree of overlap between the bounding boxes. If the original bounding box and secondary bounding box are identical or close to identical according to the similarity threshold, the image portion is identified as a true positive. In some embodiments, the degree of overlap may be compared using Jaccard index, also known as the Jaccard similarity coefficient, which is defined as the size of the intersection divided by the size of the union. For example, the threshold may be a Jaccard index of 0.8 or 0.9. Other techniques for determination of whether the original bounding box and secondary bounding box are close to identical may also be used. For example, the similarity threshold may specifying a threshold area of the secondary bounding box as a percentage of the area of the original bounding box. Those image portions that fall below the similarity threshold are identified as false positives.

In the example results of the FIG. 2C, four false positives and six true positives have been identified. Image portions 210 and 226 are identified as false positives because the text detection algorithm did not identify text in the second phase as indicated by the lack of a secondary bounding box. Image portions 212 and 228 are identified as false positives because the comparison of the secondary bounding box to the original bounding box provides a result that is below the similarity threshold. The remaining image portions 212-224 are identified as true positives because the secondary bounding box is close to the size of the original bounding box and provides a high degree of overlap, such that the comparison result is above the similarity threshold.

Figure 2D:
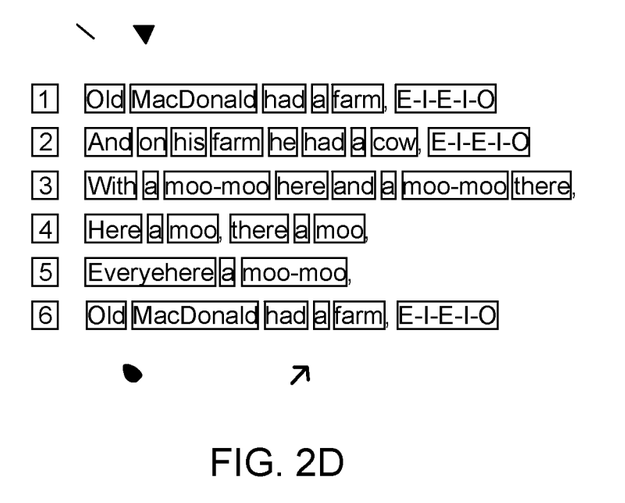

The identification of false positives is used to alter the bounding boxes in the original image, generating the image shown in FIG. 2D. As seen in FIG. 2D, the bounding boxes for the image artifacts associated with image portions 210, 212, 226, and 228 have been removed. The image shown in FIG. 2D can then be processed using the text recognition algorithm to generate the character encoded text document.

Figure 3:
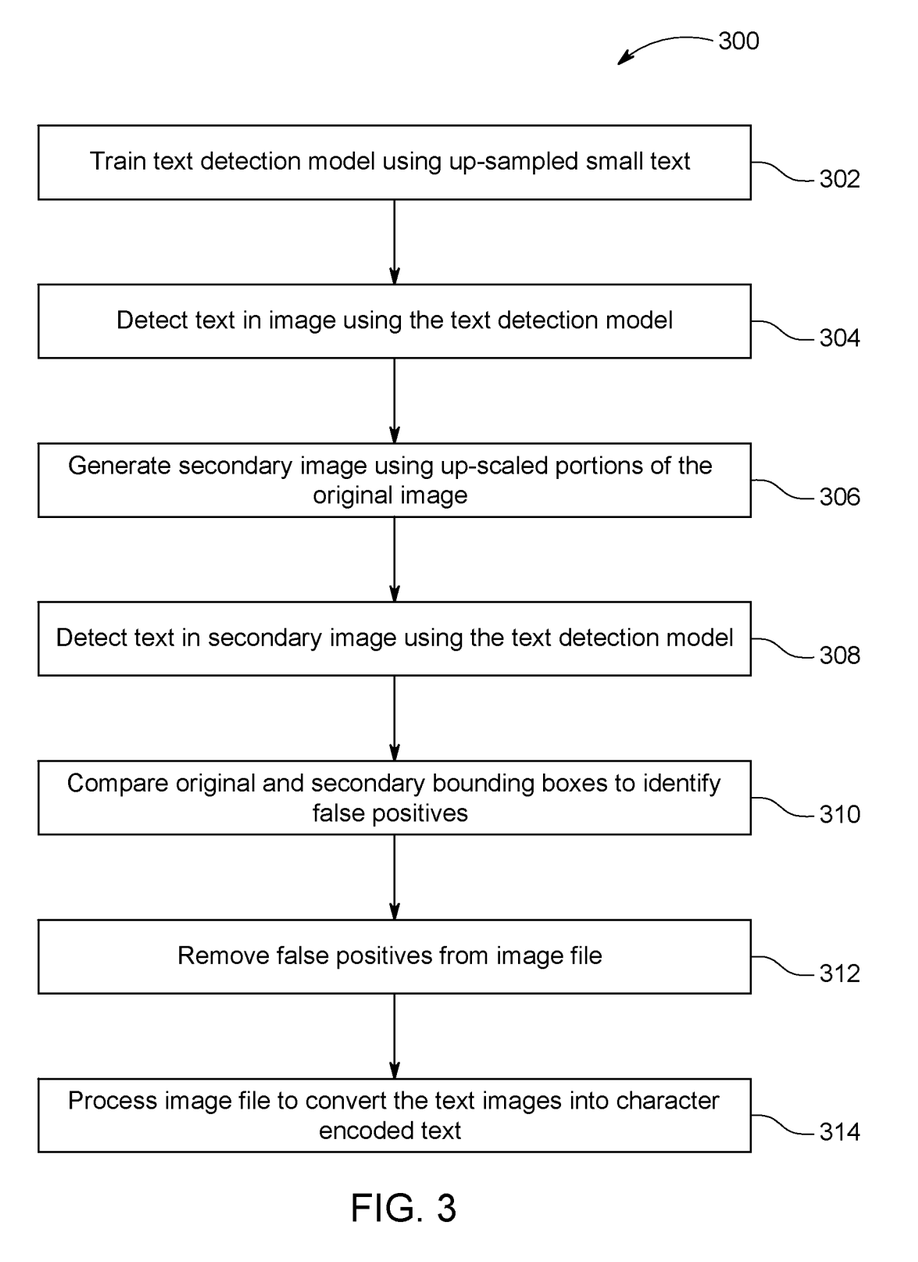
FIG. 3 is a process flow diagram of an example method of detecting text in images according to an embodiment described herein.

FIG. 3 is a process flow diagram of an example method of detecting text in images. The method 200 can be implemented with any suitable computing device, such as the computing device 100 of FIG. 1. The method may begin at block 302.

At block 302, a text detection model is trained using up-sampled small text. The up-sampled small text may be generated from labeled training images provided by a human operator. Any suitable up-scaling algorithm can be used for up-scaling the small text.

At block 304, an image document is processed to detect text using the text detection model generated at block 302. The process performed at block 304 may generate a plurality of bounding boxes that surround the portions of the image that have been identified as text. The image processed at block 304 may be referred to as the original image to distinguish it from the secondary image generated at 306.

At block 306, a secondary image is generated by up-scaling portions of the original image and copying the up-scaled portions to the secondary image. The portions of the original image that are up-scaled and copied to the secondary image are those portions associated with bounding boxes that fall below a specified size threshold.

At block 308, the secondary image is processed to detect text using the text detection model generated at block 302. The processing performed at block 308 may result in a plurality of secondary bounding boxes that surround the portions of the image that have been identified as text.

At block 310, the bounding boxes generated at block 304 are compared to the bounding boxes generated at block 308 to identify false positives. In some embodiments, the presence of a secondary bounding box for an image portion may be used to indicate the portion does contain text (true positive). In some embodiments, if a secondary bounding box is present for a particular portion, the secondary bounding box is compared to the original bounding to determine a degree of similarity. If the degree of similarity is above a similarity threshold, the image portion may be identified as containing text (true positive). Otherwise, if the degree of similarity below the similarity threshold, the image portion may be identified as not containing text (false positive).

At block 312, the original bounding boxes that are identified as false positives are removed from the image file.

At block 314, the image file is processed by a text recognition algorithm to convert the text images into character encoded text. The text recognition algorithm may be any suitable text recognition algorithm. The character encoded text may be stored as a file in a short-term memory device such as RAM, or a long term storage device such as a hard drive or solid state drive. Additionally, the character encoded text may be transferred over a network to a remote device, sent to a processing device for additional processing such as natural language processing, or processed for sending to an output device such a printer or display screen.

The process flow diagram of FIG. 3 is not intended to indicate that the operations of the method 300 are to be executed in any particular order, or that all of the operations of the method 300 are to be included in every case. Additionally, the method 300 can include additional operations not shown or described.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for detecting text in an image, comprising:
a memory device to store a text detection model trained using images of up-scaled text;
a processor to:
perform, using the text detection model, text detection on an image to generate original bounding boxes that identify potential text in the image;
generate a secondary image comprising up-scaled portions of the image associated with bounding boxes below a threshold size;
perform, using the text detection model, text detection on the secondary image to generate secondary bounding boxes that identify potential text in the secondary image;
compare the original bounding boxes with the secondary bounding boxes to identify original bounding boxes that are false positives; and
generate an image file comprising the original bounding boxes, wherein those original bounding boxes that are identified as false positives are removed.

2. The system of claim 1, wherein the processor is to process the image file with a text recognition algorithm to generate a text document comprising machine encoded text.

3. The system of claim 1, wherein to compare the original bounding boxes with the secondary bounding boxes to identify original bounding boxes that are false positives comprises:
determine whether a secondary bounding box has been generated for the portion of the image associated with a specific one of the original bounding boxes; and
if no secondary bounding box has been generated, identify the specific one of the original bounding boxes as a false positive.

4. The system of claim 1, wherein to compare the original bounding boxes with the secondary bounding boxes to identify original bounding boxes that are false positives comprises, for each of the secondary bounding boxes:
compare the secondary bounding box with its corresponding original bounding box to determine a degree of similarity;
compare the degree of similarity with a similarity threshold; and
if the degree of similarity is below the similarity threshold, identify the corresponding original bounding box as a false positive.

5. The system of claim 4, wherein to determine the degree of similarity comprises to compute a Jaccard index for the secondary bounding box and its corresponding original bounding box.

6. The system of claim 4, wherein the similarity threshold is a Jaccard index of 0.8 to 0.9.

7. The system of claim 1, wherein the threshold size is a threshold height of less than 10 pixels, and the up-scaled portions of the image are up-scaled by a factor greater than 2.

8. The system of claim 1, wherein the memory device stores the images of the up-scaled text, and the processor trains the text detection model using the images of the up-scaled text.

9. The system of claim 8, wherein the images of the up-scaled text used to train the text detection model comprise text images with an original height less than 10 pixels that are up-scaled by a factor of 3 or more.

10. The system of claim 1, wherein the image is one of:
a scanned document;
and an image captured by a camera.

11. A method of detecting text in an image, comprising:
performing text detection on an image to generate original bounding boxes that identify potential text in the image;
generating a secondary image comprising up-scaled portions of the image associated with bounding boxes below a threshold size;
performing text detection on the secondary image to generate secondary bounding boxes that identify potential text in the secondary image;
comparing the original bounding boxes with the secondary bounding boxes to identify original bounding boxes that are false positives; and
generating an image file comprising the original bounding boxes, wherein those original bounding boxes that are identified as false positives are removed; and processing the image file with a text recognition algorithm to generate a text document comprising machine encoded text.

12. The method of claim 11, wherein comparing the original bounding boxes with the secondary bounding boxes to identify original bounding boxes that are false positives comprises:
   determining whether a secondary bounding box has been generated for the portion of the image associated with a specific one of the original bounding boxes; and
   if no secondary bounding box has been generated, identifying the specific one of the original bounding boxes as a false positive.

13. The method of claim 11, wherein comparing the original bounding boxes with the secondary bounding boxes to identify original bounding boxes that are false positives comprises, for each of the secondary bounding boxes:
   comparing the secondary bounding box with its corresponding original bounding box to determine a degree of similarity;
   comparing the degree of similarity with a similarity threshold; and
   if the degree of similarity is below the similarity threshold, identifying the corresponding original bounding box as a false positive.

14. The method of claim 13, wherein determining the degree of similarity comprises to computing a Jaccard index for the secondary bounding box and its corresponding original bounding box.

15. The method of claim 11, wherein the threshold size is a threshold height of less than 10 pixels, and the up-scaled portions of the image are up-scaled by a factor greater than 2.

16. A computer program product for detecting text in images comprising a computer readable storage medium having program instructions embodied therewith, wherein the computer readable storage medium is not a transitory signal per se, and wherein the program instructions are executable by a processor to cause the processor to:
   perform text detection on an image to generate original bounding boxes that identify potential text in the image;
   generate a secondary image comprising up-scaled portions of the image associated with bounding boxes below a threshold size;
   perform text detection on the secondary image to generate secondary bounding boxes that identify potential text in the secondary image;
   compare the original bounding boxes with the secondary bounding boxes to identify original bounding boxes that are false positives; and
   generate an image file comprising the original bounding boxes, wherein those original bounding boxes that are identified as false positives are removed.

17. The computer program product of claim 16, wherein to compare the original bounding boxes with the secondary bounding boxes to identify original bounding boxes that are false positives comprises:
   determine whether a secondary bounding box has been generated for the portion of the image associated with a specific one of the original bounding boxes; and
   if no secondary bounding box has been generated, identify the specific one of the original bounding boxes as a false positive.

18. The computer program product of claim 16, wherein comparing the original bounding boxes with the secondary bounding boxes to identify original bounding boxes that are false positives comprises, for each of the secondary bounding boxes:
   compare the secondary bounding box with its corresponding original bounding box to determine a degree of similarity;
   compare the degree of similarity with a similarity threshold; and
   if the degree of similarity is below the similarity threshold, identify the corresponding original bounding box as a false positive.

19. The computer program product of claim 18, wherein to determine the degree of similarity comprises to compute a Jaccard index for the secondary bounding box and its corresponding original bounding box.

20. The computer program product of claim 16, wherein the threshold size is a threshold height of less than 10 pixels, and the up-scaled portions of the image are up-scaled by a factor greater than 2.

\* \* \* \* \*